United States Patent [19]
Freedman

[11] 3,931,622
[45] Jan. 6, 1976

[54] VOICE-MODULATED TRANSPONDER SYSTEM

[75] Inventor: Nathan Freedman, West Newton, Mass.

[73] Assignee: Raytheon Company, Lexington, Mass.

[22] Filed: May 22, 1973

[21] Appl. No.: 362,717

Related U.S. Application Data

[63] Continuation of Ser. No. 65,348, Aug. 19, 1970, abandoned, which is a continuation of Ser. No. 747,661, July 25, 1968, abandoned.

[52] U.S. Cl.................. 343/6.5 R; 325/13; 343/7.6
[51] Int. Cl.².... G01S 9/56; H03K 7/08; H03K 7/10
[58] Field of Search........... 343/6 R, 6.5 R, 6.5 LC, 343/7.6, 17.5; 325/5, 13

[56] References Cited
UNITED STATES PATENTS

| | | | |
|---|---|---|---|
| 2,407,199 | 9/1946 | Wolff | 343/7.6 |
| 2,425,315 | 8/1947 | Atwood et al. | 325/13 X |
| 2,444,452 | 7/1948 | Labin | 343/6 R X |
| 2,495,737 | 1/1950 | Labin et al. | 343/7.6 X |
| 2,607,004 | 8/1952 | Harris | 343/175 X |
| 2,910,683 | 10/1959 | Todd | 343/7.6 |
| 3,341,845 | 9/1967 | Deman | 343/6.5 LC |
| 3,359,554 | 12/1967 | Hoffmann-Heyden | 343/6.5 LC |
| 3,460,139 | 8/1969 | Rittenbach | 343/6 R |

Primary Examiner—Malcolm F. Hubler
Attorney, Agent, or Firm—Herbert W. Arnold; Joseph D. Pannone; Milton D. Bartlett

[57] ABSTRACT

A voice-modulated transponder system comprising an interrogator and a light-weight transponder. In the described embodiment, the interrogator is airborne and the transponder is located on the ground. The interrogator can locate the position of the transponder and simultaneously therewith two-way voice communication between the interrogator and transponder is possible.

7 Claims, 7 Drawing Figures

INTERROGATOR

TRANSPONDER

INVENTOR
NATHAN FREEDMAN

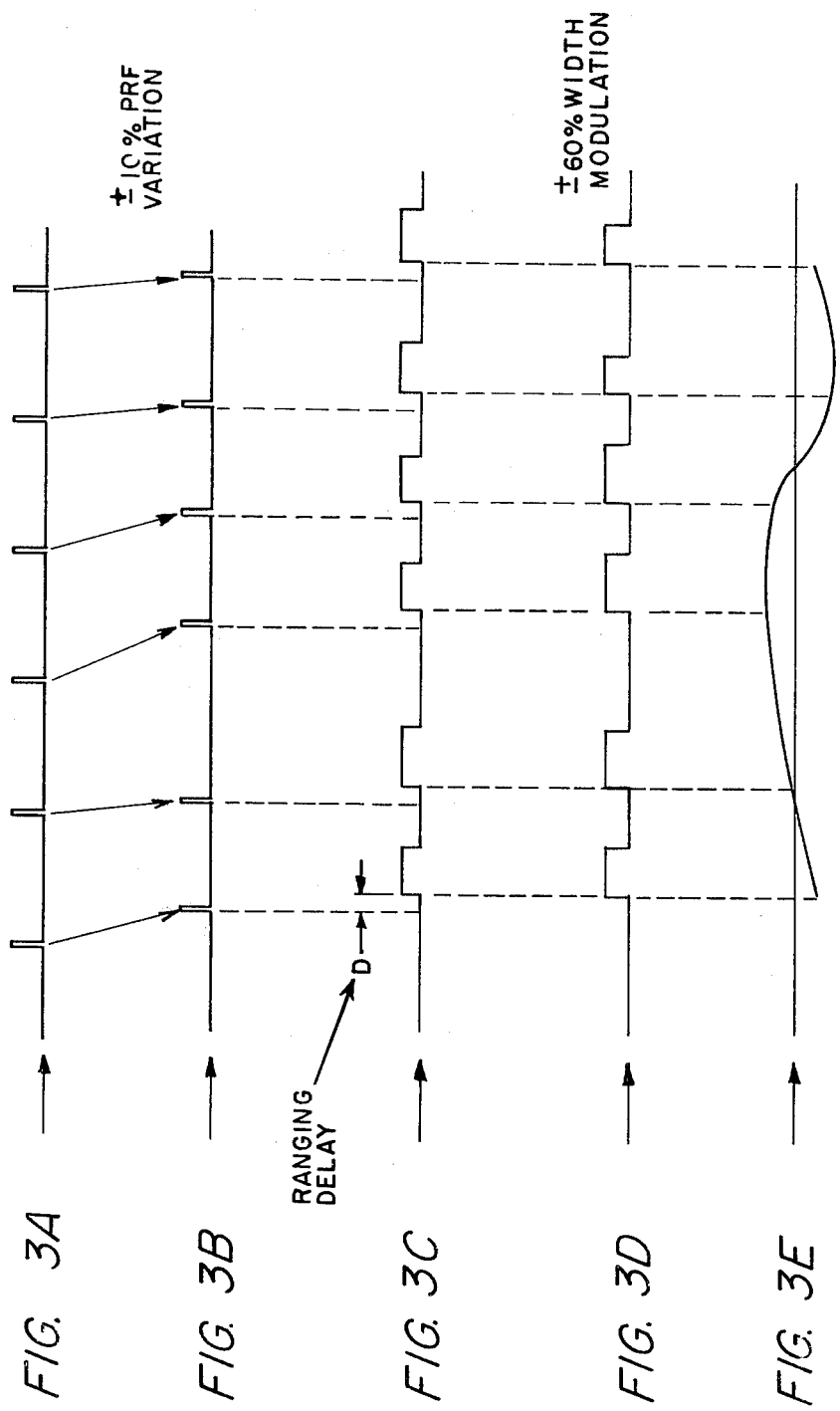

3,931,622

VOICE-MODULATED TRANSPONDER SYSTEM

This application is a continuation of application Ser. No. 65,348, filed Aug. 19, 1970, now abandoned, which is a continuation of application Ser. No. 747,661, filed July 25, 1968, now abandoned.

BACKGROUND OF THE INVENTION

Various types of transponder systems are well known in the prior art but for the most part such systems utilizing a radar interrogator do not permit voice communications between the interrogator and the transponder. Other prior art systems use radio responder beacons for measuring the altitude of an aircraft. Of course, the use of pulse width modulation in voice communication systems is old but such prior art systems make no suggestion of application in transponder systems. Still other prior art systems use radiosonde for obtaining meteorological data but do not use voice communications.

The present invention overcomes the deficiencies of the prior art by providing a voice-modulated transponder system including an interrogator utilizing pulse repetition frequency (PRF) modulation and a transponder utilizing pulse width modulation (PWM) which can both locate the position of the transponder and simultaneous therewith permit two-way voice communication between the interrogator and the transponder. In the described embodiment, wherein the range of the system is under 10 miles, the interrogator is basically a small X-band secondary radar set which is airborne and may be mounted on a helicopter or light aircraft. The interrogator is compact and light enough to be carried on light aircraft or helicopters and at the same time may be added conveniently to larger tactical aircraft without great difficulty. The transponder which is hand carried is characterized by its extreme compactness, lightness and low battery drain. The transponder is compatible with most existing airborne radars in that it could reply as a beacon to their interrogations even though voice communications was not possible. This compatibility feature fixes the interrogation frequency of the system at X-band and the reply frequency at 9310 MHz. The system has capabilities for obtaining a range and bearing of the transponder with high accuracy to within a small fraction of a mile and the range of the system is very flexible depending on the particular applications. Both the airborne interrogator and the transponder are omnidirectional so that there is no need to scan for each to find the other. The present invention may have military application for communication between ground personnel and aircraft and could also be used for aircraft navigation and search and rescue operations on both land and sea.

SUMMARY OF THE INVENTION

The above objects and advantages of the present invention as well as others are achieved by providing a voice-modulated transponder system comprising an interrogator means for simultaneously transmitting both interrogation signals and voice signals utilizing one form of modulation and transponder means located remotely from said interrogator means for simultaneously receiving said interrogation and voice signals and for simultaneously transmitting both location information in the form of return signals and voice signals back to said interrogator means utilizing another form of modulation.

BRIEF DESCRIPTION OF THE DRAWINGS

FIGS. 3A – E are graphs of the waveforms as seen at the interrogator shown in FIG. 1.

DESCRIPTION OF THE PREFERRED EMBODIMENTS

Figure 1:
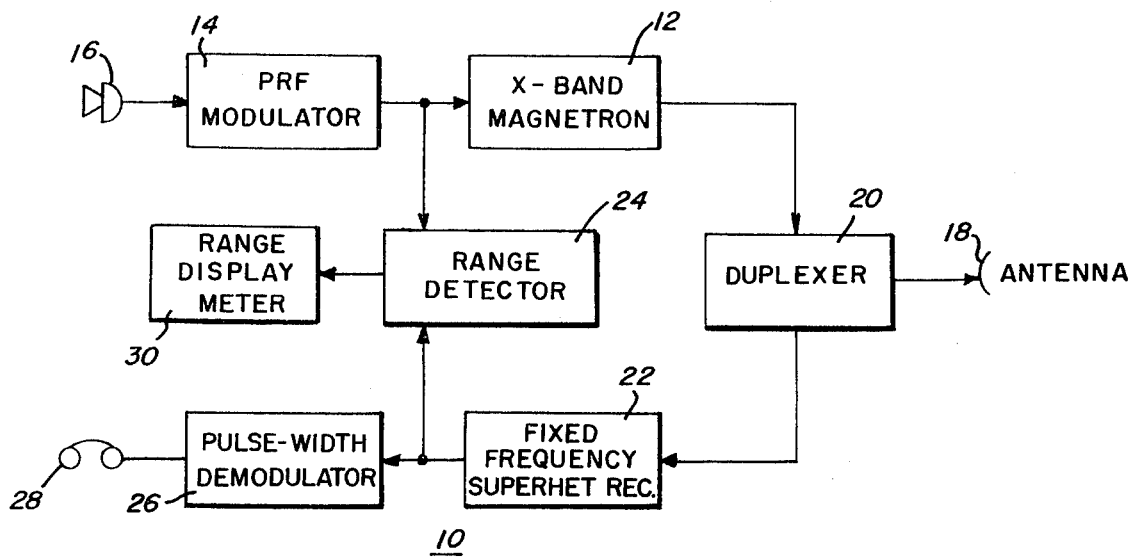
FIG. 1 is a block diagram of the interrogator of the present invention.

FIG. 1 shows a block diagram of an interrogator 10 which is airborne and is basically a small X-band secondary radar. In describing the present system, the equation defining the range of the system will assist in understanding the invention:

$$R = \frac{\lambda}{4\pi} \; G_1 G_2 \; \left[\frac{P_T g_c}{S}\right]^{1/4} \qquad (1)$$

where:
$\lambda$ = the system wavelength
$G_1$ = the interrogator antenna gain
$G_2$ = the transponder antenna gain
$P_T$ = the interrogator power
$g_c$ = the transponder's mixer conversion gain
$S$ = the interrogator receiver's minimum signal The required interrogator power is obtained by solving the beacon equation:

$$P_T = \frac{S(4\pi R)^2}{G_1 G_2 \lambda^2} \qquad (2)$$

The source of power in the interrogator 10 is an X-band magnetron 12. The pulse repetition frequency (PRF) of the magnetron 12 is modulated by a PRF modulator 14 in order to convey speech intelligence which is received from a microphone 16. The interrogator 10 employs a steerable horn antenna 18 which is connected to a duplexer 20 which may be a ferrite circulator. The output of the magnetron 12 is fed to the duplexer 20. The output of the duplexer 20 is applied to a fixed frequency superheterodyne receiver 22. Both the output of the PRF modulator 14 and of the receiver 22 are applied to a range detector 24 whose output is fed to a range display meter 30. The output of the receiver 22 is also applied to a pulse width demodulator 26 whose output may be received as voice communications over earphones 28.

A transponder 40 which is carried on the ground includes a crystal video receiver 42 which receives signals from an antenna 44 via a duplexer 46 which may be a small circulator. The antenna 44 is horizontally polarized, is essentially omnidirectional in azimuth and has sufficient vertical directivity to provide about 7db gain. The transponder 40 also includes a frequency-multiplying X-band transmitter 48 which may be a crystal-controlled transistor/varactor multiplier. The output from the receiver 42 is applied to a PRF demodulator 50 which provides voice signals over earphones 52. The output of the receiver 42 is also fed to a pulse width modulator 54. Also applied to the modulator 54 through a microphone 56 are the out going voice signals. The output of the modulator 54 is applied to the transmitter 48.

The operation of one embodiment of the system is as follows: The magnetron 12 is the source of X-band power in the aircraft. Its PRF is about 7 or 8 KHz, and its PRF is modulated to convey speech intelligence to the transponder 40. Normal speech will cause the PRF to swing to 10%. The aircraft antenna 18 is chosen to have about 18 db gain and at the given frequency a 5 inch horn antenna is employed.

In the present example $G_1 = 18$ db, $G_2$ (as before) = 8 db, $= 3 \times 10^{-2}$m, $S = 10^{-8}$ watts (for a crystal video receiver, approximately), $R = 5$ miles or 8 km. Solving equation (2) above, $P_T$ turns out to be 280 watts peak. Small magnetrons rated at a few kw peaks are available. For example, the Raytheon type RK-7521 or CK6248 weighs about 10 ounces, and puts out 1 kw peak at a duty cycle of 0.5%. At a PRF of 8 kc, this allows a pulse length of 0.6 microseconds. The interrogation range obtainable using this magnetron is close to 10 miles.

At the transponder 40, the received signal is detected and amplified by receiver 42 and demodulated by PRF demodulator 50 for listening. In parallel with this, the pulse signal out of the receiver 42 is fed to the transponder's transmitter 48 through the pulse-width modulator 54. The modulator 54 stretches the input pulse by a considerable amount, so that the actual pulse applied to the transmitter 48 has a duty cycle of about 50% (this takes advantage of the fact that the solid-state transmitter 48 is peak rather than average power limited). The amount of stretch is voice modulated, leading to pulse width modulation of the response link. The transmitter 48 of the transponder 40 transmits on the standard 9310 MHz beacon channel and therefore, the transponder behaves as a normal unmodulated radar beacon when interrogated by beacon-equipped airborne radars. The transponder's antenna 44 is omni-directional in azimuth. Voice communication with the interrogator 10 is accomplished by pulse-width modulating the transponders 9310 MHz response in pulse-width modulator 54. The response pulse length is normally 25 microseconds in the communications mode and with normal speech, the width swings ± 15 microseconds. The crystal oscillator of transmitter 48 runs continuously but the multiplier stages are pulsed on and off with modulator 54.

At the interrogator 10, the beacon signal is received superheterodyne fashion by receiver 22 which is tuned to 9310 MHz (the local oscillator in this case can be a stable source such as is used in the transponder). Receiver 22 accomplishes two functions simultaneously — the pulse-width demodulator 26 recovers speech information from the transponder signal and the range detector 24 measures the range from the interrogator 10 to the transponder 40 by generating a voltage proportional to the time delay between the leading edge of the transmitted pulse and the leading edge of the received pulse. The range is displayed on a meter 30. The scale of meter 30 may be made nonlinear so that range reading accuracy may be improved at short ranges. A small indicator light may be provided near the meter in order to indicate to the operator that a usable signal is being received. Such a light is valuable in the process of antenna scanning by the interrogator, which will ordinarily precede a communication. The lighting of the indicator will alert the operator to the correct pointing angle. The required transponder transmitter 48 power can be calculated as it was above. Here, the receiver 22 sensitivity S, assuming a noise figure of 8 db, an IF bandwidth of 100 KHz, and an audio bandwidth of about 4 KHz, is about $25 \times 10^{-14}$ watts. This signal level will produce a 10 db signal-to-noise ratio at IF, and much better than that at audio. The required power lever $P_T$ is down by the ratio of sensitivities $2.5 \times 10^{-14} - 10^{-8}$, or $2.5 \times 10^{-6}$. $P_T$ for the transponder 40 turns out to be only 0.7 mw for the 5-mile range. Assuming that the transponder 40 can actually put out at least 10 times this, the response range will easily exceed 10 miles. The excess power at shorter ranges will make the acquisition problem much simpler.

It should be noted that the leading edge of the pulse is not shifted by the transponder modulation process; range is determined at the interrogator 10 by comparing the leading edge of the transmitted pulse with the leading edge of the received pulse in the range detector 24. Using an interrogator receiver IF bandwidth of 100 KHz, one can estimate the position of the leading edge to at least one-tenth of the rise time, or about 1 microsecond, which is equivalent to about 500 foot range accuracy. For better accuracy at shorter ranges, it is possible to switch to a wider (say 1 MHz) IF bandwidth, or if a logarithmic IF amplifier is used, it can be arranged to have the bandwidth automatically widen as the signal strengh increases. This observed delay will also have a tendency to vary with signal strength but the variation is less than a microsecond.

There is no interference between transmitter and receiver at each site. At the transponder 40, the transmitted signal is clearly separated in time from the received signal. Voice communication is duplex so that the operations at both the interrogator and transponder can talk simultaneously as with a normal telephone and push-to-talk operation is not necessary.

Operation of the system will be further described in conjunction with FIGS. 3A – E which are plots of the waveforms as seen at the interrogator 10. Pulse transmission is required from the interrogator 10 because the square-law behavior of the crystal video receiver 42 of transponder 40 favors a pulse signal, i.e., a crystal video receiver gives a markedly poorer signal-to-noise ratio with a modulated CW signal than with a low duty cycle pulsed signal (assuming average powers of both signals are the same). The PRF modulation which is used by the interrogator must be high enough so that the audio waveform is sampled adequately — at least two samples per cycle of the highest audio frequency of interest. FIG. 3A shows the pulses transmitted by the interrogator with no modulation while 3B shows these pulses with modulation introduced. FIG. 3C shows the pulses received by the interrogator with interrogator modulation but without transponder modulation. The pulses received by the interrogator with the transponder modulation of ± 60% width modulation added is seen in FIG. 3D. The audio waveform received by the interrogator is shown in FIG. 3E.

Although the voice-modulated transponder system described above has been framed in an air-to-ground location and communication system for operation in ranges under 10 miles, the system with minor design modifications may be employed for other applications. The basic concept and operation of the present invention, however, remain the same. For example, instead of providing a separate antenna for the interrogator, the interrogator could share the antenna of a radar already on the aircraft. Such sharing could be accomplished for example, with a manually operated waveguide switch. Also, with respect to the antennas, although both the interrogator and transponder antennas have been described as being omnidirectional, depending upon the particular application one or both of these antennas may be directional.

Because of the variety of airborne radars which employ X-band, this band was chosen for the described embodiment of the invention. Other frequencies could be used and, for example, the same performance level could be attained by switching to a lower frequency, thereby requiring larger antennas but making it easier to generate rf power.

Considering the present invention purely as a two-way communicator and ignoring the range measurement, an interesting and potentially useful feature is the inherent feedback in both the interrogator and transponder communication paths. This feedback is made possible by the orthogonality of the modulation in the two paths. For example, the PRF modulation imposed by the interrogators transmitter appears back again at the interrogators received after having passed through the transponder. If desired, the output of the interrogator could be pulse-width modulated with the audio demodulated from the interrogators receiver to complete a feedback path as seen from the transponder. Such feedback has been recognized as a powerful tool for optimizing the performance of a communication link. A discussion of use of such feedback may be found in Horstein, "Sequential Transmission Using Noiseless Feedback," IEEE Trans. I.T., Vol. IT-9, pages 136 – 143, July 1963.

The PRF modulators and demodulators, the PWM modulators and demodulators, superheterodyne and crystal receivers and transmitters are all well known components, examples of which may be described in a reference such as Ryder, "Electronic Fundamentals and Applications." Magnetrons and duplexers are well known devices as are range detectors and descriptions may be found in "Microwave Duplexers" and "Electronic Time Measurements," Vol. 14 and 20 respectively of the Radiation Laboratory Series.

Figure 2:
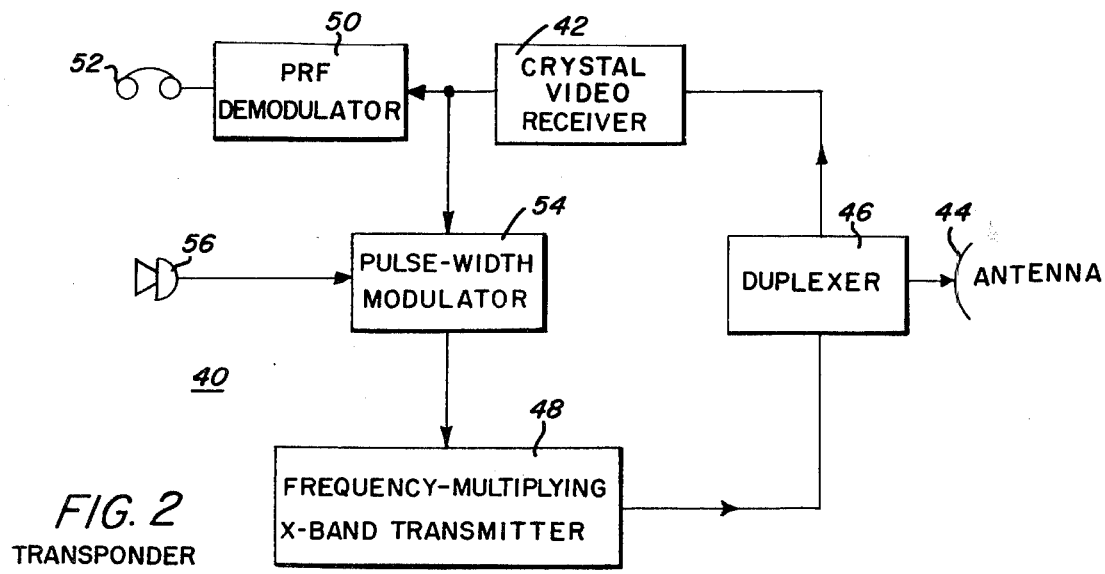
FIG. 2 is a block diagram of the transponder of the present invention.

The voice-modulated transponder system of the present invention as described in conjunction with FIGS. 1 – 3 has basic military applications for close air support of ground troops, particularly, targeting, forward area resupply and identification. In addition to these military applications, the present invention also has commercial applications as a lightweight communications link, aircraft navigation and search and rescue operations on both land and sea.

It should be understood, of course, that the foregoing disclosure relates to only a preferred embodiment of the invention and that numerous modifications or alterations may be made therein without departing from the spirit and the scope of the invention as set forth in the appended claims.

I claim:

1. A system for communicating between an interrogator and a transponder comprising:
    an interrogator including means for transmitting a pulse train signal, said transmitting means comprising means for modulating a pulse repetition frequency of its pulse train signal in accordance with a first voice type signal;
    the transponder including means for receiving said pulse train signal and means responsive to said received pulse train signal for transmitting a pulse train signal having the same pulse repetition frequency and modulation thereof as said received pulse train signal, said transponder transmitting means comprising means for modulating the pulse width of its transmitted pulses in accordance with a second voice type signal;
    said interrogator further including means for receiving signals transmitted by said transponder, means coupled to said interrogator receiving means and to said interrogator transmitting means for providing signals in response to the time elapsed between the transmission of a pulse signal by said interrogator and the reception of a pulse signal from said transponder, and means coupled to said interrogator receiving means for demodulating said pulse width modulation to recover said second voice type signal; and
    said transponder further including means coupled to said transponder receiving means for demodulating said frequency modulation to recover said first voice type signal.

2. A system according to claim 1 wherein each pulse signal transmitted by said interrogator is a pulse of radiant energy at a first carrier frequency, and wherein each pulse signal transmitted by said transponder is a pulse of radiant energy at a second carrier frequency different from said first carrier frequency.

3. A system for communicating between an interrogator and a transponder comprising:
    an interrogator including means for transmitting a pulse train signal at a first pulse repetition frequency, said transmitting means comprising means for modulating said pulse train signal with a first modulation in accordance with a first voice type signal;
    a transponder including means for receiving said pulse train signal, and means responsive to said received pulse train signal for transmitting a pulse train signal having the same pulse repetition frequency as said received pulse train signal, said transponder transmitting means comprising means for modulating its transmitted pulse train signal with a second modulation in accordance with a second voice type signal;
    said interrogator further including means for receiving signals transmitted by said transponder, means coupled to said interrogator receiving means and to said interrogator transmitting means for providing signals in response to the time elapsed between the transmission of a pulse signal by said interrogator and the reception of a pulse signal from said transponder, and means coupled to said interrogator receiving means for demodulating said second modulation to recover said second voice type signal; and
    said transponder further including means coupled to said transponder receiving means for demodulating said first modulation to recover said first voice type signal.

4. A system according to claim 3 wherein said elapsed time signaling means provides the range between said interrogator and said transponder.

5. A system according to claim 4 wherein said first modulation is a modulation of the pulse repetition frequency of the pulse train signal transmitted by said interrogator.

6. A system according to claim 5 wherein said second modulation is a pulse width modulation, a signal pulse transmitted by said interrogator is a pulse of radiant energy at a first carrier frequency, and a signal pulse transmitted by said transponder is a pulse of radiant energy at a second carrier frequency.

7. A system according to claim 4 wherein the bandwidth of said voice type signal is less than one-half the pulse repetition frequency of the pulse train signal transmitted by the interrogator.

* * * * *

UNITED STATES PATENT OFFICE
CERTIFICATE OF CORRECTION

Patent No. 3,931,622          Dated January 6, 1976

Inventor(s) Nathan Freedman

It is certified that error appears in the above-identified patent and that said Letters Patent are hereby corrected as shown below:

Col. 2, lines 17-20: "$G_1 G_2 \dfrac{P_T g_C}{S}$" should be $\sqrt{G_1 G_2} \left[ \dfrac{P_T g_C}{S} \right]$ --.

Col. 4, line 23: "strengh" should be --strength--.

Signed and Sealed this twenty-fifth Day of May 1976

[SEAL]

Attest:

RUTH C. MASON  
Attesting Officer

C. MARSHALL DANN  
Commissioner of Patents and Trademarks